June 24, 1941.  L. O. CARLSEN  2,246,503
METHOD OF RELIEVING CUTTERS
Filed May 24, 1940  2 Sheets-Sheet 1

Inventor
LEONARD O. CARLSEN
By B. F. Schlesinger
Attorney

June 24, 1941.  L. O. CARLSEN  2,246,503
METHOD OF RELIEVING CUTTERS
Filed May 24, 1940   2 Sheets-Sheet 2

Inventor
LEONARD O. CARLSEN
By B. Schlesinger
Attorney

Patented June 24, 1941

2,246,503

UNITED STATES PATENT OFFICE 2,246,503

METHOD OF RELIEVING CUTTERS

Leonard O. Carlsen, Rochester, N. Y., assignor to Gleason Works, Rochester, N. Y., a corporation of New York Application May 24, 1940, Serial No. 337,025

5 Claims. (Cl. 51—288)

The present invention relates to the relieving of gear cutters and particularly to the relieving of disc-type gear cutters of the "Revacycle" type.

"Revacycle" cutters are employed for cutting straight bevel gears, such as straight bevel differential gears. They have a plurality of radially arranged cutting blades and different blades are differently formed to cut at different points along the length of the teeth of a tapered gear as the cutter is rotated in engagement with a gear blank and simultaneously moved across the face of the blank. Revacycle cutters for cutting straight bevel gears are preferably provided with blades that have side-cutting edges of circular arcuate profile shape and the corresponding side-cutting edges of different blades are preferably made of uniform profile shape but with their centers of curvature displaced from one another both radially and axially of the cutters, as fully described in the co-pending patent application of Ernest Wildhaber, Serial No. 181,177 filed December 22, 1937. When such a cutter is rotated on its axis and is simultaneously fed across the face of a gear blank in time with its rotation, teeth properly tapering in width and height and changing properly in profile shape from one end to the other will be produced.

Heretofore, Revacycle cutters of the type described have been relieved by rotating a cutter under a suitably shaped grinding wheel while effecting a reciprocating movement between the cutter and wheel once for each blade to be relieved, and simultaneously effecting a relative feed between the cutter and wheel once per revolution of the cutter in a direction inclined to the axis of the cutter at approximately the mean pressure angle to the cutter. The feed movement served to displace the centers of curvature of successive blades from one another. The speed of this prior relieving process is limited, of course, by the necessity for effecting a relative reciprocatory movement between the relieving tool and the cutter once for each blade of the cutter. Moreover, it presents difficulties so far as relieving the blades for their full length from front to back is concerned. The relieving tool must be returned to initial position after the relieving of one blade so as not to interfere with the next blade of the cutter.

The primary purpose of the present invention is to provide a faster, simpler, and cheaper method for relieving blades of rotary gear cutters of the type described.

Another object of the invention is to provide an improved method for relieving cutters of the type described which will permit of readily relieving the blades for their full length from front to back and which is readily applicable to the manufacture of such cutters whether they have large or small numbers of blades.

Other objects of the invention will be apparent hereinafter from the specification and from the recital of the appended claims.

The blades of a "Revacycle" type cutter are, as already stated, arranged radially of the axis of the cutter. For relief grinding the tip surfaces of the blades of such a cutter by the process of the present invention, the blades are removed from their own head and are mounted in a dummy head so that they are non-radial of the axis of the dummy head. Then a cylindrical grinding wheel is engaged with the top surface of a blade and the wheel and dummy head are rotated on their respective axes. For relief-grinding their side surfaces, the blades are mounted in a dummy head which may be similar to or identical with the first described dummy head. The dummy head is then preferably secured fixedly to a rotary work spindle so that its axis is inclined to the axis of the work spindle and is offset from the axis of the work spindle. A grinding wheel dressed to a suitable profile, preferably a circular arc, is then engaged with one of the cutting blades and the side surfaces of the blades are relieved simply by rotating the wheel on its axis while rotating the work spindle on its axis. The eccentric mounting of the dummy head on the work spindle causes the side surfaces of the blades to be ground with profiles having centers of curvature displaced from one another and the inclination of the dummy head to the axis of the work spindle causes this displacement to take place in a direction lateral of the axis of the work spindle and inclined to the axis of the work spindle at the mean pressure angle of the blades. Thus the centers of curvature of the profiles of successive blades are displaced from one another radially and axially of the dummy head, and when the relieved blades are placed in their own head, after relieving, the centers of curvature of the profiles of successive blades will be displaced properly from one another as desired for the cutting of a bevel gear.

Figure 1:
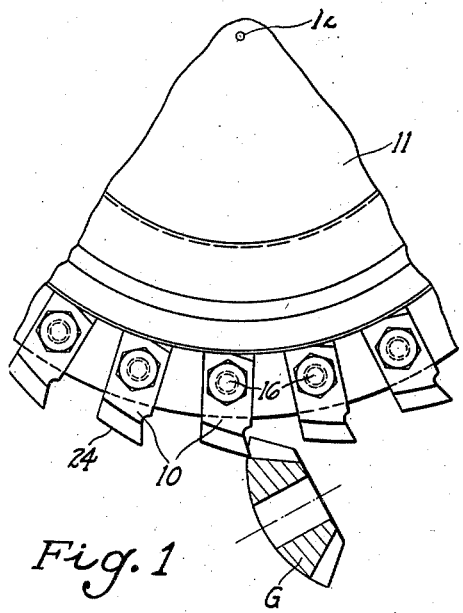
Fig. 1 is a fragmentary view showing a Revacycle cutter in engagement with a bevel gear blank for cutting the teeth of the blank.

A Revacycle cutter has, as shown in Fig. 1, a plurality of cutting blades 10 which are mounted in a cutter head 11 to extend radially of a common axis 12. The blades may be secured by bolts 16 in blade-receiving slots that are provided in the head. As already stated, Revacycle cutters are preferably made with side-cutting edges of circular arcuate profile curvature and corresponding side-cutting edges are preferably made of the same profile curvature with the centers of curvature of corresponding side-cutting edges of successive blades progressively displaced from one another. This structure is illustrated clearly in Fig. 2 which shows superimposed upon one another the blades which cut at the small end, the center, and the large end, respectively of a tooth space.

The positions of opposite side-cutting edges of the blade which is intended to operate at the small end of the tooth space, are shown in dotted lines and denoted at 13 and 13', respectively. Opposite side-cutting edges of the blade, which is intended to operate at a point midway the length of a tooth space, are denoted at 14 and 14', respectively and shown in full lines. The positions of opposite side-cutting edges of the blade, which is intended to operate at the large end of the tooth space, are shown in dotted lines and denoted at 15 and 15', respectively. Opposite side-cutting edges of the blades of the cutter are preferably made symmetrical with reference to a median plane 23 perpendicular to the cutter axis 12. Corresponding side-cutting edges 15 have the same radii of curvature. The centers of curvature of corresponding side-cutting edges of successive blades are, however, displaced from one another. Thus the center of curvature of the side-cutting edge 13 may be at 17, the center of curvature of the side-cutting edge 14 may be at 18 and the center of curvature of the side-cutting edge 15 may be at 19. In the preferred construction, the centers of curvature of successive blades are on a line such as denoted at 20 which extends in the direction of the mean pressure angle of the blade and is parallel to a tangent to the cutting edges at the pitch line of the tooth to be cut.

Figure 2:
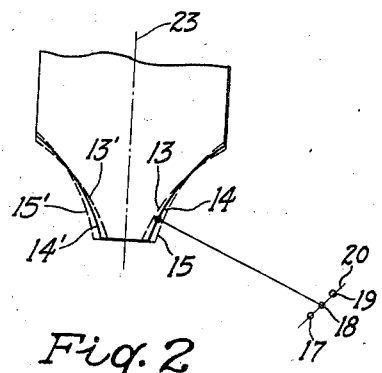
Fig. 2 is a diagrammatic view showing different blades of such a cutter superimposed on one another in a common radial plane, showing how the centers of curvature of the profiles of different blades of the cutter are displaced from one another.
Figure 3:
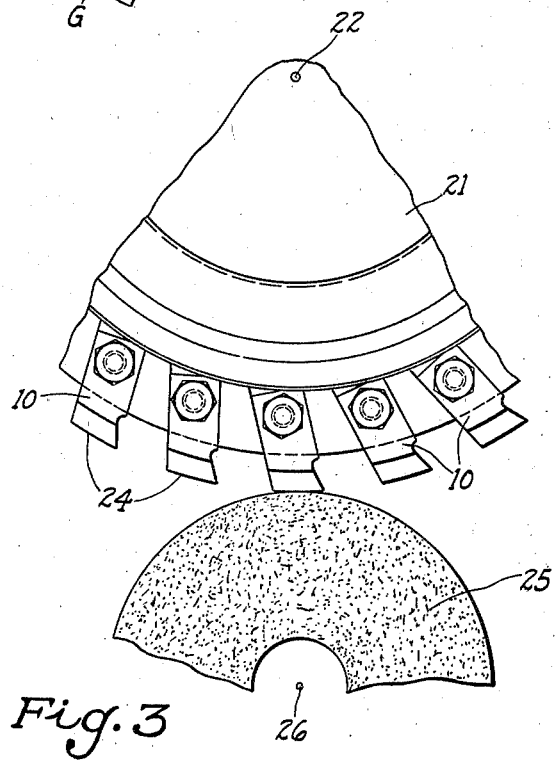
Fig. 3 is a fragmentary view showing the blades of the cutter of Fig. 1 mounted in a dummy head and illustrating how the tip surfaces of these blades may be relief-ground.
Figure 4:
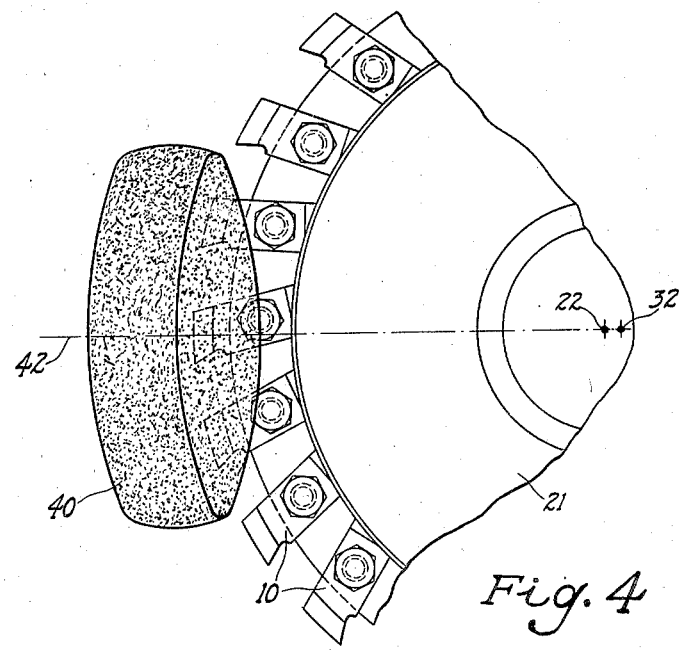
Fig. 4 is a fragmentary plan view and Fig. 5 a sectional view illustrating the method of relief-grinding the side surfaces of the blades of the cutter according to the present invention.

The blades may all be made of the same height as shown in the cutter illustrated in Figs. 1 and 2 of the drawings of the present application, or they may be made of progressively varying heights for the purposes described more in detail in the above mentioned Wildhaber application No. 181,177. In the cutting of a bevel gear with such a cutter, the cutter is rotated on its axis and simultaneously fed relative to the gear blank along the length of the gear teeth in time with the cutter rotation so that the different blades of the cutter cut at different points along the length of the blank.

For relief grinding the blades of a cutter such as shown, the blades 10 are removed from their own head 11 and mounted in a dummy head 21 so that they are non-radial of the axis 22 of the dummy head. For relief grinding the top surfaces 24 of the blades, a cylindrical grinding wheel 25 may be employed, and the grinding wheel and dummy head are rotated on their axes 26 and 22, respectively, while the grinding wheel is fed depthwise to remove the required amount of stock from the tips of the blades. Thus cylindrical surfaces will be ground on the tips of the blades concentric with the axis of rotation 22 of the dummy head. When the blades are mounted in their own head 11, however, the cylindrical tip surfaces of the different blades will be eccentric of the axis 12 of rotation of the head 11 and hence the desired cutting clearance on the tip surfaces of the blades will be provided.

For grinding the side surfaces of the blades, the blades are mounted non-radially in a dummy head 21 or in a head similar thereto and this dummy head is mounted on a work spindle 30 so that the axis 22 of the dummy head is inclined to and offset from the axis 32 of the work spindle. Thus, the dummy head 21 may be secured by a clamping plate 33 to a block 35 whose upper surface 36 is inclined to the axis 32 of the work spindle 30.

This block is mounted for lateral adjustment on the work spindle 30, the work spindle being formed with an enlarged head 37 on which the block 35 is slidably mounted. The block can be adjusted slidably on the head by adjusting screws 38 and 39. The block is fixedly secured to the head after adjustment by any suitable means (not shown).

Figure 5:
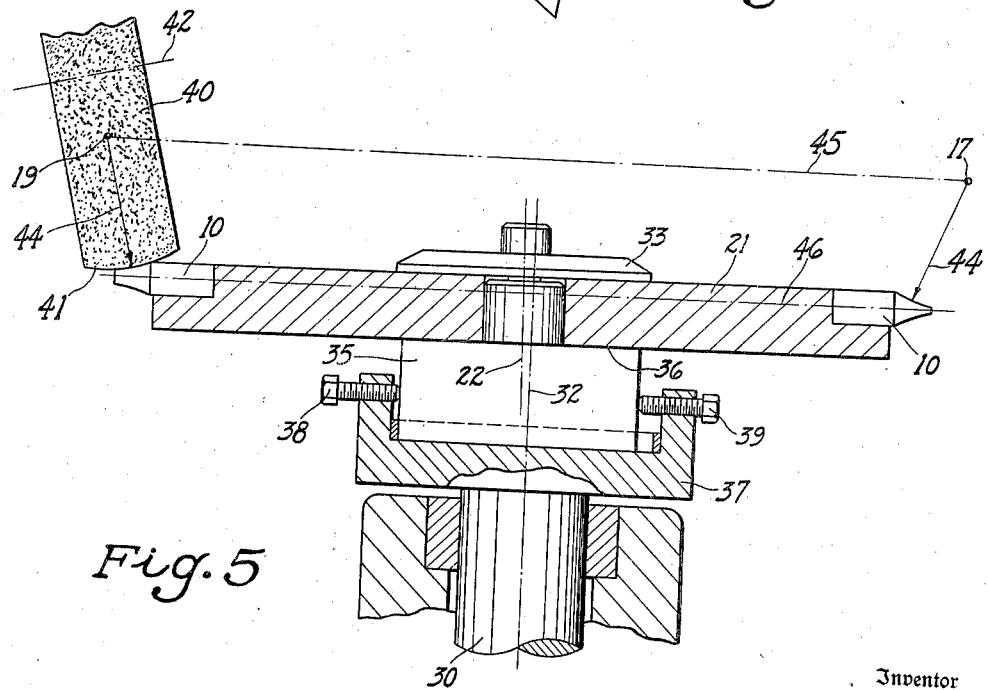

For relief-grinding the side surfaces of one side of the blades, a grinding wheel 40 having an operating surface 41 of convex circular arcuate profile may be employed. In the relief grinding operation, this grinding wheel is rotated on its axis 42 while the work spindle 30 is rotated on its axis 32. Because of the eccentric mounting of the dummy head and its inclination to the axis of the spindle, side surfaces will be ground on the blades 10 which are such as may be enveloped by a sphere whose radius 44 equals the profile radius of the grinding wheel 40 and whose center is displaced in a direction inclined to the axis of the dummy head at an angle corresponding to the inclination of the line 20 of centers (Fig. 2) to the axis 12 of the cutter itself. Thus, the center of curvature 19 of the blade which cuts at the large end of the tooth is shown at the left in Fig. 5 and the center of profile curvature 17 of the blade which cuts at the small end of the tooth is shown at the right in this same figure. These centers and likewise the centers of curvature of the corresponding side surfaces of intermediate blades all lie in a plane 45 which is perpendicular to the axis 32 of the work spindle and inclined to the median plane 46 of the blades in the dummy head.

By turning the dummy head 21 on its axis 22 through half a turn (180°) and adjusting the block 35 laterally on the work spindle 30, and moving the grinding wheel 40 to engage the lower sides of the blades 10, these sides of the blades can be relief-ground in the same way as the upper sides of the blades. When the blades are mounted in their own head 11, then, they will have the proper cutting clearance behind their side-cutting edges.

While the invention has been described in connection with a particular embodiment thereof, it will be understood that the invention is capable of various further modification and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of relieving the side surfaces of blades of a disc-type gear cutter having radially arranged blades, which comprises mounting the blades non-radially in a rotary head but at a uniform distance from a common center, positioning a grinding wheel, that has an operating surface of curved profile in an axial plane, in engagement with a side surface of a blade, and rotating the grinding wheel on its axis while rotating the head on an axis eccentric of said common center.

2. The method of relieving the side surfaces of blades of a disc-type gear cutter having radially arranged blades, which comprises mounting the blades non-radially in a rotary head, positioning a grinding wheel, that has an operating surface of curved profile in an axial plane, in engagement with a side surface of a blade, and rotating the wheel on its axis while rotating the head about an axis which is inclined to the rotary head.

3. The method of relieving the side surfaces of blades of a disc-type gear cutter having radially arranged blades, which comprises mounting the blades non-radially in a rotary head but at a uniform distance from a common center, positioning a grinding wheel in engagement with a side surface of a blade, and rotating the wheel on its axis while rotating the head on an axis eccentric of and inclined to the head.

4. The method of relieving the side surfaces of blades of a disc-type gear cutter having radially arranged blades, which comprises mounting the blades non-radially in a rotary head but at a uniform distance from a common center, positioning a grinding wheel in engagement with a side surface of a blade, and rotating the wheel on its axis while rotating the head about an axis which is inclined to the head and simultaneously producing a relative movement between the grinding wheel and head in a direction perpendicular to the axis of rotation of the head to vary the positions of successive blades to said axis of rotation during the grinding of successive blades.

5. The method of relieving the side surfaces of blades of a disc-type gear cutter which comprises mounting the blades non-radially in a rotary head but at a uniform distance from a common center, engaging with a blade of the cutter a rotary grinding wheel that is of convex circular arcuate profile in an axial plane, and rotating the wheel on its axis while rotating the head about an axis offset from said common center and inclined to the head.

LEONARD O. CARLSEN.